United States Patent Office 2,859,060
Patented Nov. 4, 1958

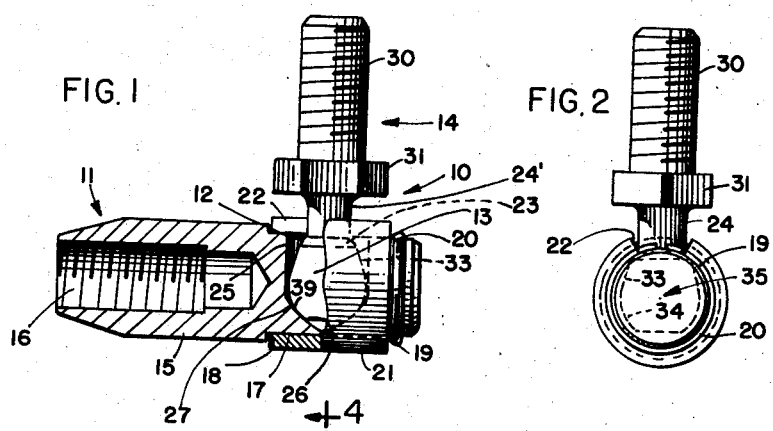

2,859,060

BALL JOINT

Gilbert E. Davies and Gino L. Gasparini, Fort Wayne, Ind., assignors to Superior Ball Joint Corporation, a corporation of Indiana Application October 17, 1955, Serial No. 540,881

7 Claims. (Cl. 287—90)

This invention relates to a ball joint, and more particularly to a universal-type ball joint which may be simply and economically constructed.

It is the general object of the present invention to produce a new and improved ball joint.

It is a more specific object of the present invention to produce a ball joint which is simple and economical to manufacture and assemble, and yet is capable of performing in the manner desired for devices of this nature.

One of the principal features of the present invention is the provision of a ball joint having a socket-forming member and a ball member wherein the ball may be placed and retained in the socket in a simple and expedient manner, and when so arranged, a relatively wide angular travel of one relative to the other is permitted. By virtue of the foregoing feature, the socket-forming member may be attached to a rod or other movable element and the ball member may be attached to a second rod or other movable device and afterwards may be seated in the socket and retained therein by means of a movable retainer, as a result of which ready adjustment and location of the parts is facilitated.

Other and further objects, advantages and features of the present invention will be readily apparent from the following description and drawings, in which:

Fig. 1 is a side elevational view partly in section showing a ball joint incorporating the present invention;

Fig. 2 is an end elevational view of the ball joint of Fig. 1;

Fig. 3 is a view like Fig. 1 of a modified form of the invention;

Fig. 4 is a vertical sectional view taken along line 4—4 of Fig. 3;

Fig. 5 is a view like Fig. 1 of a further modified form of the invention; and

Fig. 6 is an enlarged exploded view of the ball and socket portion of the device of Fig. 5.

While this invention is susceptible of embodiments in many different forms, there is shown in the drawings and will herein be described in detail several embodiments, with the understanding that the present disclosure is to be considered as an exemplification of the principles of the invention and is not intended to limit the invention to the embodiments illustrated. The scope of the invention will be pointed out in the appended claims.

Referring now to Figs. 1 and 2 of the drawings, there is shown a ball joint 10 comprising a first member 11 having a drilled crosshole 12 forming a socket adapted to receive a ball 13 on a ball member 14. The member 11 is provided with a generally cylindrical portion 15 having an internally threaded opening 16 therein for receiving the threaded end of a rod or the like. The member 11 has, adjacent the portion 15, a second cylindrical portion 17 of reduced diameter to form a shoulder or stop 18 at the juncture of the two cylindrical portions. The stop 18 acts in conjunction with a second stop formed by a snap ring 19 seated in an annular groove 20 to hold a cylindrical retaining sleeve 21 in position on the reduced portion 17.

The sleeve 21 is rotatable on the reduced portion 17 and is provided with a slot 22 extending from side to side thereof parallel to the axis of the cylindrical portion 17, with the sides of the slot engaging a neck portion 23 formed on the lower end of the stem 24 of the ball member 14. The crosshole 12 has a first generally cylindrical portion 25 which terminates in a V-bottom 26 to produce a crosshole which extends only a part of the distance through the cylindrical portion 17. A portion of the V-bottom 26 forms a seat 27 for the ball 13.

The ball member 14 is provided with a threaded end 30 to facilitate attachment to another member or element, together with a hexagonal portion 31 for the reception of a wrench or other tightening tool.

As can be seen in the drawings, adjacent to the neck portion 23 the ball member is provided with a frusto-conical section 33. The ball is also provided with a bearing portion 34 in the form of a section of a sphere, which is adapted to ride upon the seat 27 and provide universal movement for the ball member. The spherical bearing portion 34 has a diameter substantially equal to the diameter of the crosshole portion 25, and the center of curvature 35 of the bearing portion is, in the embodiment illustrated, located on the axis of the cylindrical portion 17.

The angular movement permitted the ball member 14 depends to a degree upon the movement of the ball member required to bring the frusto-conical section 33 into contact with the sides of the crosshole, and thus, on the inclination from parallelism with the axis of the ball member of the sides of the section 33. For a 30° total movement of the ball member, the sides of the portion 33 are each inclined 15° away from the axis of the ball member.

It is, of course, quite desirable that the ball member pivot or swing freely on the socket-forming member. If the ball portion of the ball member were in the usual spherical form, swinging movement of the ball member in a plane normal to the axis of the member 11 would cause the portions of the ball adjacent the neck or stem to press outwardly against the underside of the retaining ring. To eliminate binding resulting from such pressure is one of the objects of the particular construction illustrated.

Thus, it will be observed that the neck portion 23 is in effect a section of a sphere having a radius equal to the radius of the interior surface or underside of the retaining ring 22, and the center of curvature of the neck portion coincides with the center of curvature of the retaining ring when the ball member is in a plane normal to the axis of the retaining ring. As the ball member swings, the neck portion does not press outwardly against the underside of the sleeve and free swinging movement is permitted.

Clearly, other methods for preventing binding may be used; for example, the retaining ring may be of very resilient material so that it may yield under the pressure of the ball without unduly resisting swinging movement, or the underside of the ring may be relieved along the areas of contact on either side of the slot.

In assembling the ball joint just described, it will be clear that upon placing the ball 13 in the socket 12 and sliding the retaining sleeve 21 over the right-hand end (as seen in Fig. 1) of the member 11, the ball member will be thereby connected to the member 11. Snapping the ring 19 into the groove 20 will serve to retain the sleeve 21 in position, and thus complete the assembly of the joint.

A somewhat modified form of construction is illustrated in Figs. 3 and 4. In order to avoid repetition of the parts of the modified form which are similar to those previously described, similar parts have been given similar but primed reference numerals. The ball joint of Figs. 3 and 4 differs from that of Figs. 1 and 2 in that the crosshole 12' extends completely through the cylindrical portion 17', terminating in a hole 40 of lesser diameter than the entrance hole. In addition, the snap ring 19 and annular groove 20 of the device of Fig. 1 have been eliminated and supplanted by an integral tapered shoulder 41 formed on the right-hand end of the member 11'. In this construction, the sleeve 21' may be spread slightly so as to slip over the shoulder 41, with the sleeve having sufficient resiliency as to be capable of snapping into position on its seat formed by the cylindrical portion 17'.

A still further form of the invention is shown in Figs. 5 and 6, where, like the device of Fig. 1 have been given similar reference numerals, but in this case double primed.

As shown in Fig. 5, the ball member 14" may very readily be attached and detached from the member 11" by reason of the fact that the cylindrical portion 17" provided adjacent the crosshole 12" has been extended to the left (as seen in Fig. 5) a distance slightly greater than the width of the sleeve 21" to form a second cylindrical portion 50 extending as a continuation of the portion 17". Seated between a shoulder 51 formed at the end of the cylindrical extension 50 and the opposing end of the sleeve 21" is a compression spring 52, normally arranged to urge the sleeve 21" against the snap ring 19" at the opposite end of the member 11". As will be readily apparent, the sleeve 21" may be moved to the left against the bias of the spring 52 to bring it to the position indicated by dotted lines uncovering the crosshole 12", thereby permitting the insertion or withdrawal of the ball member. Release of the sleeve permits the spring to urge it to the position illustrated in solid lines, where the ring operates to retain the ball in the socket. The compression of the spring, of course, is insufficient to prevent rotation of the retaining sleeve 21", and thus universal movement is permitted.

In all of the embodiments described, it is clear that the arrangement of the bearing portion 34 and the seat 27 should be such as to permit swinging movement of the ball member without causing a resulting radial movement thereof relative to the axis of the member 11. In the preferred arrangement, the sides of the V-bottom 26 meet at the center of the crosshole at an angle of 45° and the bearing portion 34 is a spherical section.

It will be apparent to those skilled in the art that the relative contacting and moving portions of the ball joints just described can be provided with a number of finishes, and can be case hardened where a long-wearing joint is required. Furthermore, changes can be made in the construction and relative arrangement of the parts with resulting changes in operation. For example, if the sleeve 21 is made non-rotatable, the ball member 14 may have swinging movement only in a plane parallel to the slot 22, and if the angle of inclination of the frusto-conical portion 33 (or if the relative shape of the sides of said portion 33 and the contacting sides of the crosshole) is altered, the permissible swinging movement of the ball member in any direction is similarly altered.

We claim:

1. A ball joint comprising a socket-forming member having a crosshole therein with said crosshole having a portion of reduced diameter forming a seat; a ball member having a stem, a bearing portion slidably engaging the seat to permit the ball member to pivot thereon, and a neck portion in the form of a section of a sphere positioned intermediate the bearing portion and the stem, said spherical section having its center of curvature coincident with the pivotal axis of the ball member; a retainer mounted on the socket-forming member for rotation relative to said socket-forming member about an axis coincident with the center of curvature of the spherical section, said retainer being provided with means forming an opening, the edges of which engage said neck portion of the ball member, and means resisting movement of the retainer longitudinally of the socket-forming member.

2. A ball joint comprising a first member having a cylindrical portion provided with a radial crosshole extending beyond the axis of said cylindrical portion and terminating in a restriction forming a seat; a ball member having a stem, a neck portion in the form of a section of a sphere having a radius of curvature approximately equal to the radius of curvature of said cylindrical portion, and a bearing portion in the form of a section of a sphere having a diameter substantially equal to the diameter of the crosshole and having its center of curvature on the axis of the cylindrical portion, said bearing portion being adapted to engage said seat with the center of curvature of the spherical section on the neck portion being also located on the axis of the cylindrical portion; means on said first member forming a stop at one side of said cylindrical portion; a retaining sleeve rotatably seated on said cylindrical portion and bearing at one side against said stop, said sleeve being provided with a slot open on said side and extending parallel to said axis, with the edges of the slot engaging the neck portion to retain the ball member in the crosshole; and a second stop on the first member on the opposite side of the cylindrical portion and engaging the other side of the retaining sleeve.

3. The ball joint of claim 2 in which said second stop comprises a circumferential groove formed in said first member, and a snap ring removably positioned in said groove.

4. The ball joint of claim 2 in which said second stop comprises an integral portion of the first member having a diameter greater than the diameter of the cylindrical portion and in which said retaining sleeve is formed of resilient material and is snapped over said integral portion to seat on said cylindrical portion.

5. A ball joint comprising a first member having a cylindrical portion provided with a radial crosshole extending beyond the axis of said cylindrical portion and terminating in a restriction forming a seat; a ball member having a stem and a bearing portion in the form of a spherical section adapted to engage said seat, said spherical section having its center of curvature on the axis of said cylindrical portion; means on said first member forming a stop at one side of said cylindrical portion; a retaining sleeve rotatably seated on said cylindrical portion and bearing at one side against said stop, said sleeve being provided with a slot open on said side and extending parallel to said axis, with the edges of the slot engaging a spherical section formed on the stem to retain the ball member in the crosshole with the last-named spherical section having its center of curvature coincident with the center of curvature of the first-named spherical section; and a spring bearing against said retaining sleeve constantly to bias the sleeve against the stop, said sleeve being movable away from the stop against the bias of the spring to a position beyond and uncovering the crosshole.

6. A ball joint comprising a socket-forming member having a crosshole therein; a ball member having a stem, a bearing portion describing a section of a sphere and a neck portion positioned intermediate the bearing portion and the stem; and a retaining sleeve having a generally cylindrical interior surface rotatably seated on the socket-forming member, said sleeve having an opening therein, the edges of which engage the neck portion and said neck portion being generally in the form of a section of a sphere having a radius substantially equal to the radius of said cylindrical surface, the center of curvature of said spherical section forming the bearing portion and the center of curvature of the spherical section forming the neck portion being coincident and lying on the axis of the cylindrical surface of the sleeve.

7. A ball joint comprising a first member having a cylindrical portion provided with a radial crosshole having a depth greater than the radius of said portion and terminating in a seat; a ball member having a stem, a neck portion in the form of a section of a sphere having a radius of curvature approximately equal to the radius of curvature of said cylindrical portion, and a bearing portion in the form of a section of a sphere having its center of curvature on the axis of said cylindrical portion, said bearing portion engaging said seat with the center of curvature of the spherical section on the neck portion being also located on the axis of the cylindrical portion; and a retaining member rotatably mounted on said cylindrical portion and engaging said neck portion to retain the ball member in the crosshole.

References Cited in the file of this patent

UNITED STATES PATENTS

| 1,093,348 | Mooers | Apr. 14, 1914 |
| 1,628,914 | Ridenour | May 17, 1927 |
| 2,102,463 | Hufferd | Dec. 14, 1937 |

FOREIGN PATENTS

| 8,192 | Great Britain | A. D. 1914 |
| 17,444 | Great Britain | A. D. 1915 |
| 138,867 | Australia | Oct. 3, 1950 |
| 888,057 | France | Aug. 30, 1943 |